Dec. 20, 1966  E. J. McKENICA  3,292,472
AUTOMOBILE TUBE CUTOFF APPARATUS
Filed July 22, 1964  4 Sheets-Sheet 2

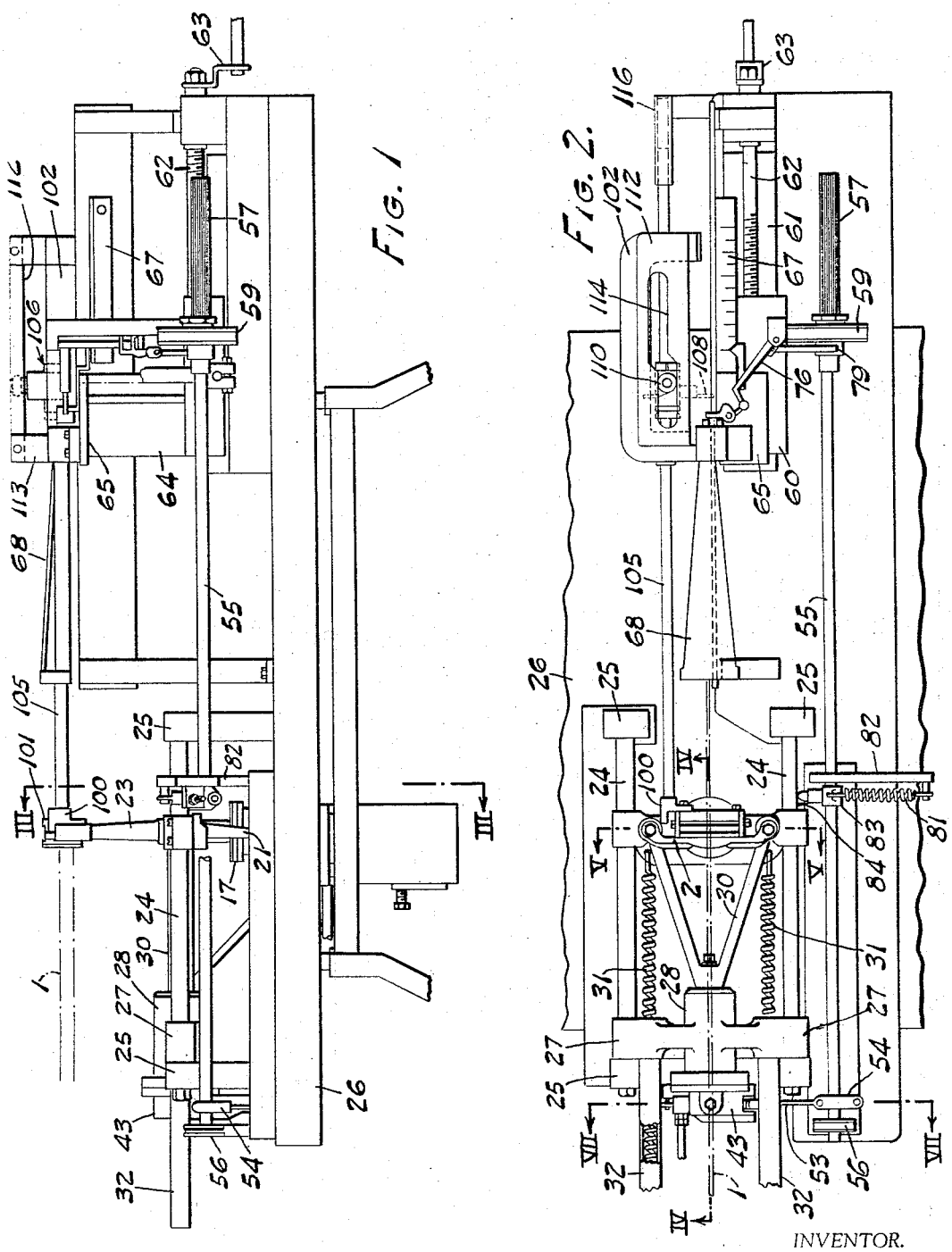

INVENTOR.
EDWIN J. McKENICA
BY
Christel & Bean
ATTORNEYS

Dec. 20, 1966 E. J. McKENICA 3,292,472
AUTOMOBILE TUBE CUTOFF APPARATUS
Filed July 22, 1964 4 Sheets-Sheet 3
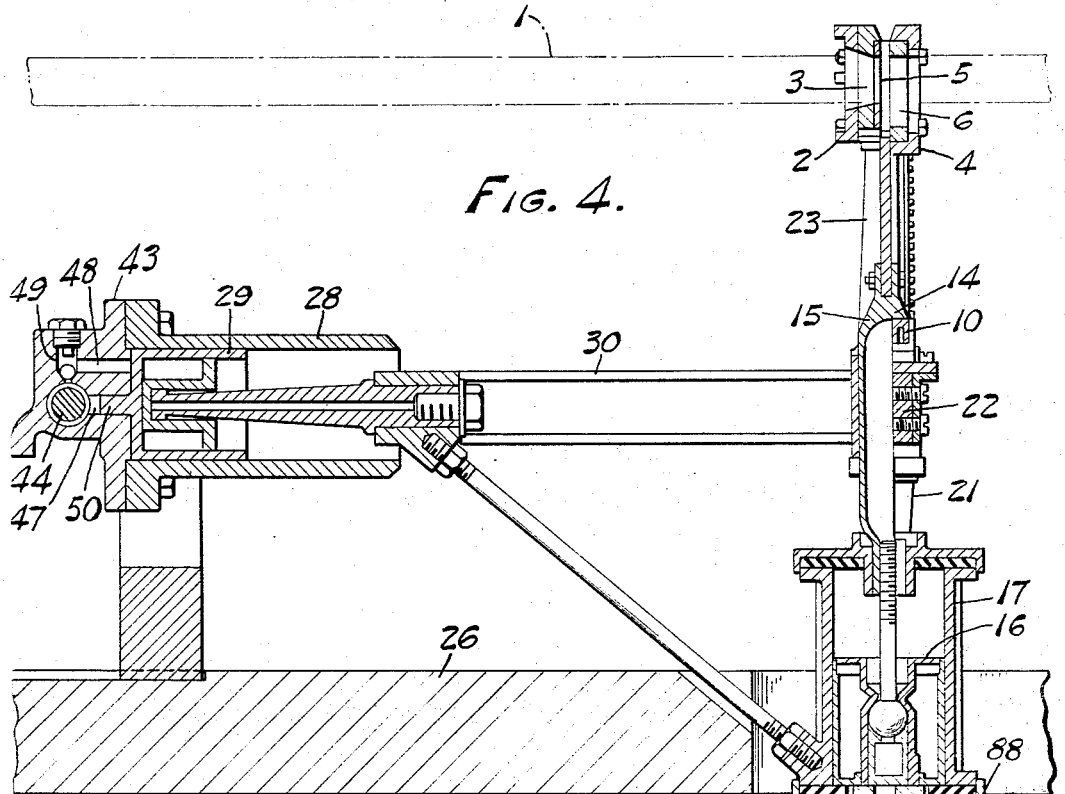
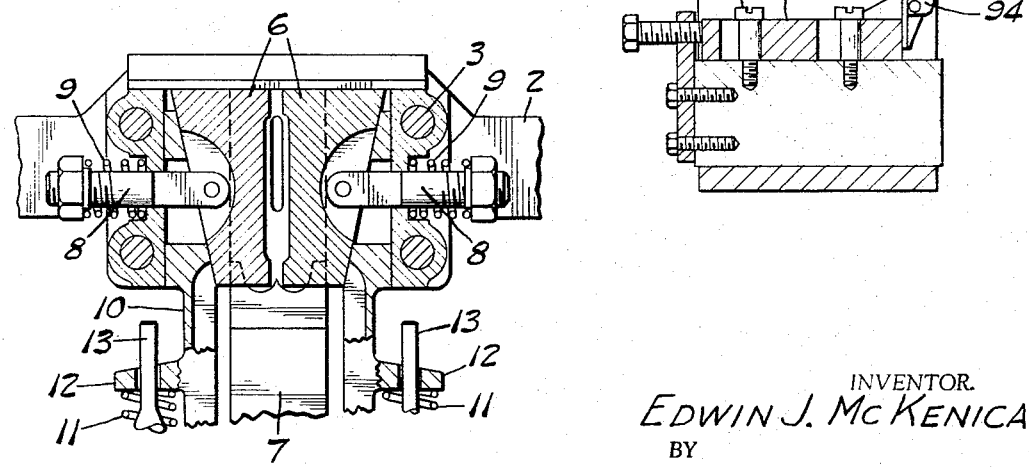
INVENTOR.
EDWIN J. McKENICA
BY
Christel & Bean
ATTORNEYS Dec. 20, 1966  E. J. McKENICA  3,292,472
AUTOMOBILE TUBE CUTOFF APPARATUS
Filed July 22, 1964  4 Sheets-Sheet 4
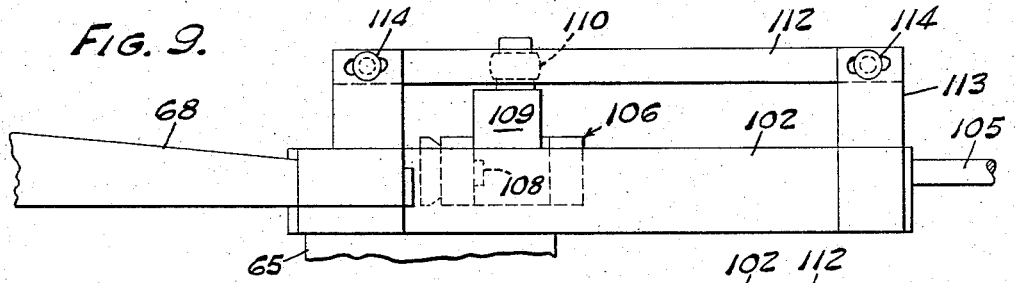
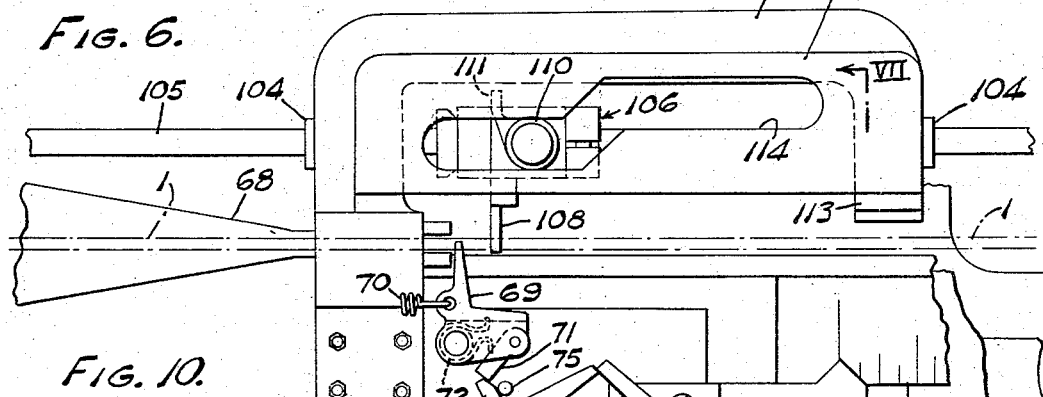
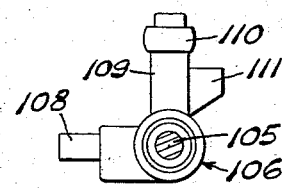
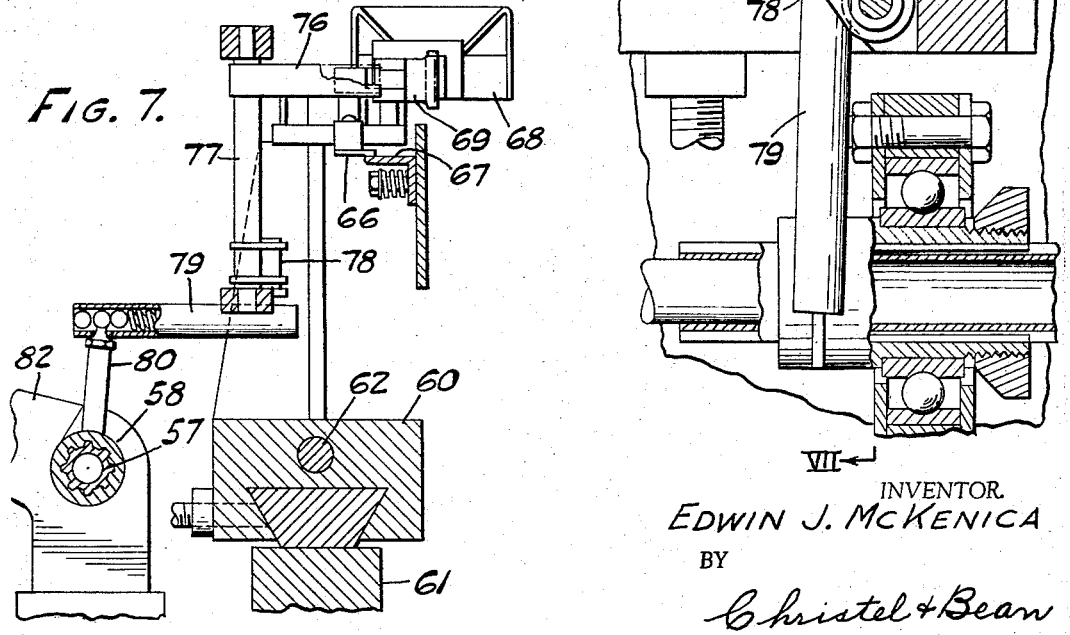
INVENTOR.
EDWIN J. McKENICA
BY
Christel & Bean
ATTORNEYS

United States Patent Office 3,292,472
Patented Dec. 20, 1966

3,292,472
AUTOMOBILE TUBE CUTOFF APPARATUS
Edwin J. McKenica, Williamsville, N.Y., assignor to Joseph F. McKenica & Son, Inc., Buffalo, N.Y.
Filed July 22, 1964, Ser. No. 384,425
4 Claims. (Cl. 83—294)

This invention relates to flying shear or automatic cutoff machines for automatically cutting off accurately predetermined lengths of stock during forward travel thereof.

The apparatus of the present invention is of the general type illustrated and described in United States Letters Patent No. 2,325,431 to Leo C. Shippy dated July 27, 1943, but comprises a substantial improvement therein from the standpoint of accuracy of length measurement of pieces of stock cut by the machine. The Shippy patent and the present application show cutoff apparatus for cutting off lengths of sheet metal tubing of relatively flat cross section such as is commonly employed in manufacturing heat exchangers and the apparatus is adapted to receive tubing which issues continuously from tubing fabricating machinery. However, it is to be understood that the principles of the present invention may be employed for other cutting off operations and applications, insofar as such principles may be usefully employed in cutting off lengths of moving stock of a rigid or semi-rigid material of any kind.

In the aforesaid Shippy patent a knife carriage is mounted for to and fro movement in the direction in which the tubing travels and is adapted to grip and cut the tubing during forward movement. In Shippy the knife carriage is driven forwardly by an air cylinder and at a given point in its forward travel another air cylinder is activated to operate the gripping and cutting mechanism of the knife carriage. Numerous sources of variation and inaccuracy are inherent in this general arrangement.

In Shippy a trigger mechanism is engaged by the leading end of the tubing as the latter travels through the apparatus and the trigger mechanism operates a valve which energizes the air cylinder which produces forward travel of the knife carriage. Thus there is an obvious time lag from the instant the trigger mechanism is contacted by the tubing until the knife carriage air cylinder reaches normal forward speed, due to mechanical inertia and friction and the time required for air flow. This time lag is variable and cannot be predicted with any degree of accuracy. Furthermore, the forward speed of the carriage depends on the degree of air pressure available and therefore the carriage will reach the gripping and cutoff point at variable time intervals from the time when the trigger mechanism is actuated. While adjustments are provided for empirically determining and adjusting the length of stock which is being cut off, conditions causing variations are not constant and stock length will vary during periods of operation.

The apparatus of the present invention employs a pneumatically operated knife carriage and a pneumatically operated gripping and cutoff means generally as in the Shippy patent but differs therefrom in a very important manner by providing adjustable mechanical measuring means for establishing a fixed cutoff length and insuring that such fixed cutoff length is maintained despite the unavoidable variations in speed and timing of the knife carriage and the gripping and cutoff mechanism described above.

Speaking generally, the present invention provides apparatus wherein the leading end of the tubing or other stock is brought against an abutment which travels with the knife carriage and is mechanically fixed thereto so that a constant, although adjustable, distance is maintained between the abutment and the cutting plane of the knife carriage and the arrangement is such that the leading end of the stock is against such abutment prior to and at the instant of stock gripping and cutting operation of the knife carriage. Further, means are provided for automatically withdrawing the abutment after cutting has been effected to permit the cut stock to fall freely from the apparatus.

While a single specific embodiment of the principles of the present invention is illustrated in the accompanying drawings and described in detail in the following specification, it is to be understood that such embodiment is by way of example only and that various mechanical modifications may be made without departing from the spirit of the invention, the scope of which is limited only as defined in the appended claims.

In the drawings:

FIG. 1 is a general side elevational view of one form of the apparatus of the present invention;

FIG. 2 is a top plan view thereof;

FIG. 4 is a longitudinal cross-sectional view on the line IV—IV of FIGS. 2 and 3;

FIG. 5 is a cross-sectional view taken approximately on the line V—V of FIG. 2;

FIG. 6 is a fragmentary plan view showing the trigger and abutment mechanism of FIG. 2 but on a larger scale;

FIG. 7 is a fragmentary elevational view, partly in cross-section, viewed as indicated by the arrows on the line VII—VII of FIG. 6;

FIG. 9 is a fragmentary elevational view of the upper portion of the structure shown in FIG. 6; and FIG. 10 is a detailed elevational view of the abutment member viewed from the right-hand side of FIGS. 6 and 9.

Figure 3:
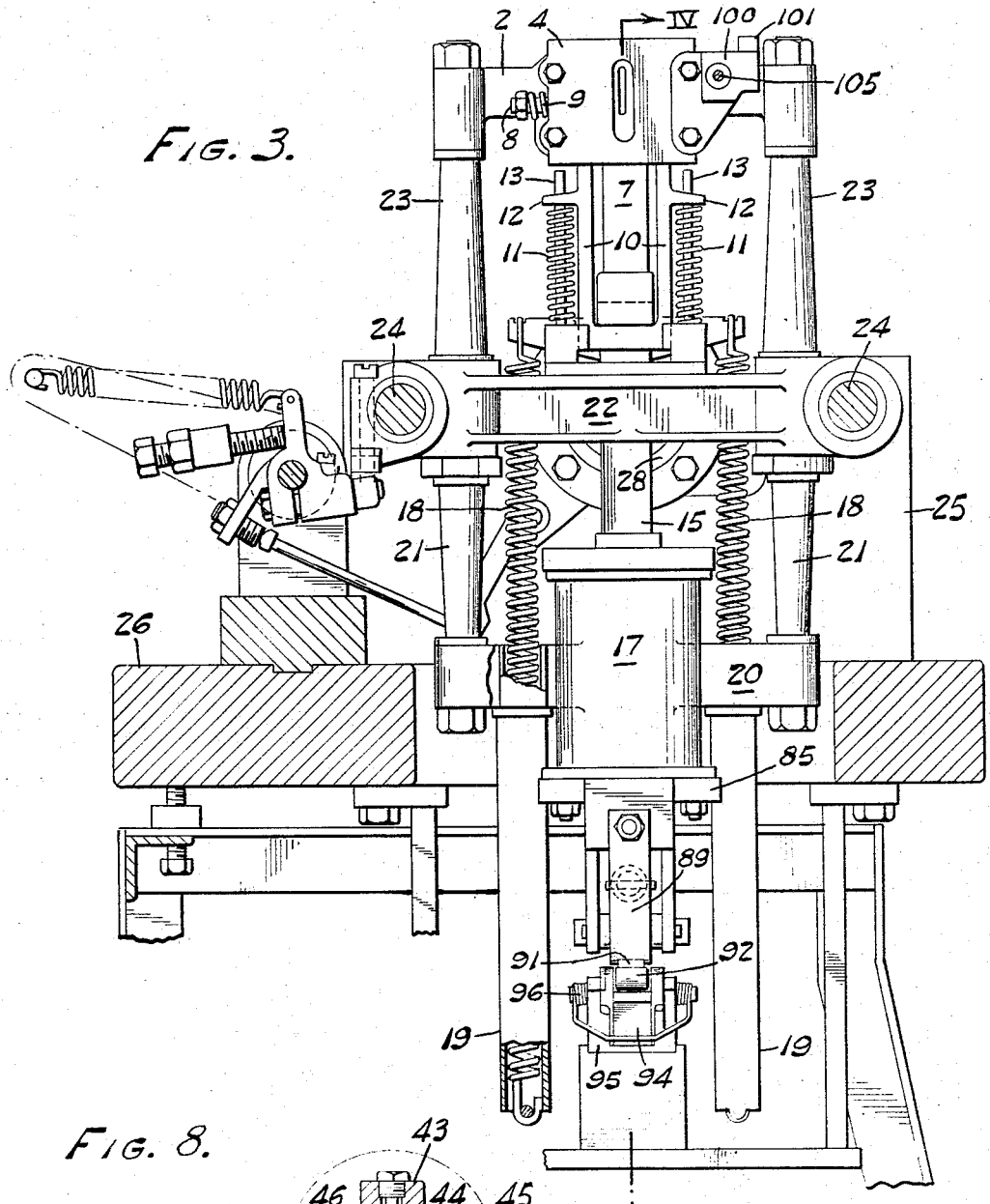
FIG. 3 is an enlarged cross-sectional view on the line III—III of FIG. 1.

Like characters of reference denote like parts throughout the several figures of the drawings. The knife carriage and the gripping and cutting mechanism thereof is substantially identical with that disclosed in the above Shippy patent and reference may be had thereto as to details of those mechanisms which may not appear to be fully illustrated in the drawings of this application. In fact, the general mechanism of the present invention substantially duplicates the mechanism of the Shippy patent, the important differences in the present case being represented by additions to the structure of the Shippy patent rather than by substantial variations therefrom.

One form of general manufacturing operation wherein the cutoff apparatus of the present invention is particularly applicable is in the formation of flat sided tubing for heat exchangers wherein the tubing is formed from a continuous ribbon of stock supplied in rolls. The flat stock is unwound, fed through shaping apparatus, sealed, straightened, and then cut to predetermined lengths.

As the tube stock, indicated in the drawings, at 1, comes from the straightening machine it passes through an apertured die head of the reciprocating knife carriage of the cutoff machine. This head may consist of a centrally apertured cross bar 2 which, as best seen in FIGURES 4 and 5, has secured thereto a die block 3 having a removable closure plate 4 and supporting a stationary die 5 and slidably mounted split die clamps 6. In the space between the dies 5 and 6 is a reciprocable tube cutoff knife blade 7. The upper edge of the knife blade is recessed to substantially W-shape, as best seen in FIG. 5 to provide a central piercing point to initiate the cut into the tube and from which piercing point diverge a pair of shearing edges which during the upward projection of the knife cut through the wall of the tube in an outward direction. The shearing force being exerted in an outward direction eliminates collapse of the tube walls, the tube walls being bucked by the dies on both sides of the knife.

The split die is located on the exit side of the shearing head and opens to avoid interference to passage of the tube after the shearing operation. Thus the laterally separable clamp dies 6 each has pivoted thereto a stud 8 projecting outwardly through the wall of the die block 3 and carrying a nut to seat an expansion spring 9. The outer faces of the clamps are formed with cam or wedge surfaces for slidable engagement with corresponding wedge surfaces at the upper ends of the spaced arms of a U-shaped slider 10. This slider 10 is urged upwardly by a pair of coiled compression springs 11 which bear against lateral ears 12 on the slide and surround vertical guide pins 13 which project through the ears 12.

In the retracted position of the parts the cross bar of the U-shaped slider 10, as best seen in FIGURES 3 and 4, extends under a ledge 14 formed on the connecting rod 15 to which the lower edge of the knife blade is secured. The opposite end of the connecting rod 15 is joined to a piston 16 contained within an air cylinder 17. Upward movement of the piston projects the knife blade through the stock and also by reason of the upward movement of the ledge 14 releases the slider 10 which under the action of the compression springs 11 slides the camming surfaces on one another and contracts the split clamps 6 against the flat walls of the tube.

On the return of the knife the ledge 14 picks up the slider and allows the spring loaded split clamps 6 to be retracted. Return of the parts is effected upon release of air pressure on the piston 16 and under influence of a pair of tension coil springs 18, which at their upper ends engage outwardly extending arms on the connecting rod structure and at their lower ends are anchored to pins and are housed within depending tubes 19 on the cross bar 20 of the slidable carriage. This cross bar 20 which preferably is formed integral with the cylinder 17 is suspended by a pair of posts 21 from the cross bar 22. Upwardly projecting posts 23 on the cross bar 22 are joined to the opposite ends of the die supporting cross bar 2.

The main supporting cross bar 22 of the knife carriage is formed with bearing heads slidable on a pair of ways or bars 24 mounted at opposite ends in standards or supporting brackets 25 projecting upwardly from the bed plate 26 of the machine. Also mounted on the slide bars 24 near the tube entrance end of the machine are the outwardly extending arms 27 for an air cylinder 28. Slidable within the cylinder 28 is a piston 29 whose forward movement is transmitted to the knife carriage by connecting arms 30. Retraction of the carriage is accomplished through a pair of tension coil springs 31 connected at their forward ends to the carriage and rearwardly enclosed by and joined to tubes 32 which are carried by the cylinder supporting arms 27.

Figure 8:
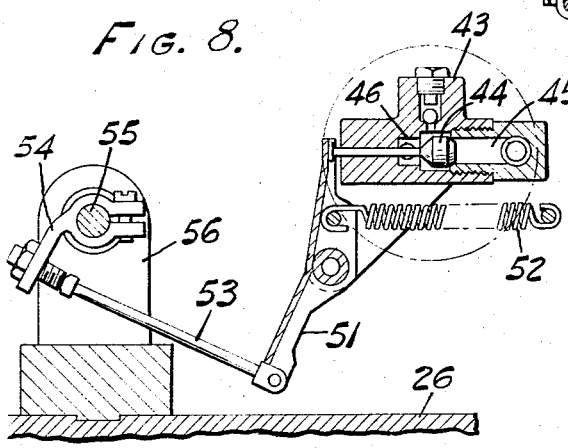
FIG. 8 is a vertical cross-sectional view taken on the line VIII—VIII of FIG. 2.

Closing the head of the cylinder 28 is a valve body 43 which, as best seen in FIGURES 4 and 8, contains a slidable valve 44. At one end the valve 44 seats over a port 45 leading from a source of air under pressure. At its opposite end it seats over a port 46 which vents to atmosphere. The intermediate chamber of the valve body 43 communicates with the piston cylinder through either of two ports 47 and 48. The port 48 contains a one-way check valve 49 while the port 47 is arranged to receive a projecting stud 50 on the head of the piston 29. In operation when the valve 44 is moved to the left in FIGURE 8 the vent to atmosphere is closed and air under pressure lifts the check valve 49 and acts against the head of the piston 29 to move the knife carriage forward. When the valve 44 thereafter is returned to the position shown in FIGURE 8 the air under pressure is cut off and the piston cylinder is vented through the ports 46 and 47, allowing piston return as the springs 31 restore the knife carriage. A too rapid return and abrupt stop of the carriage is eliminated by the fit of the projection 50 into the port 47 in the final range of piston return movement. This fit is such as to allow trapped air to act as a cushion and thereafter bleed out to atmosphere.

The operating stem for the valve 44 projects through the valve body 43 and is engaged by one of a pivoted lever 51 which is held in engagement with the valve stem by a coil spring 52. The opposite end of the lever is connected by a link 53 to a crank arm 54 fixed to a rockshaft 55. This rockshaft has its end adjacent to the crank 54 supported in a bearing or upright post 56 and extends longitudinally of the machine where its opposite end is secured or welded to a splined sleeve 57 on which is slidably keyed a collar 58 rotatably mounted in a supporting bearing 59. The bearing 59 is connected to a longitudinally adjustable block 60 slidably dovetailed on a fixed support 61 and threadedly receiving a screw shaft 62 which projects beyond the end of the machine and carries a hand crank 63. Supported above the block 60 by an upright 64 is a plate 65, which among other things carries a pointer finger 66 movable over a scale 67 on which markings may be placed to indicate the distance from the knife cutoff operation to which the supporting block 60 is set by the screw 62 and hand crank 63.

Also carried by the plate 65 is a funnel-shaped guide 68 to lead the end of the oncoming tube 1 to the restricted end of the guide where there is located the trigger release mechanism controlling the operation of the valve 44. This mechanism (see FIGURE 6) includes a pivoted bell crank 69 having a pad urged by a coil spring 70 against the end and over the throat of the guide 68. Pivoted in the other arm of the bell crank 69 is a pawl 71 normally pressed outwardly by a looped spring 72, for engagement at its end with a bell crank latch 73. A coil spring 74 normally holds the latch in engagement with a stop 75 in position to obstruct swinging movement of a lever 76. The lever 76 is keyed on the upper end of a vertical shaft 77 which at its lower end has projecting therefrom a lever 78 linked by a tie rod 79 to a radial arm 80 fixed on the collar 58. The slidable spline connection between the collar 58 and the shaft 55 accommodates longitudinal adjustment of the parts by the hand crank 63.

In operation when the trigger mechanism is set by the hand crank 63 for the desired length of tube to be cut off, the end of the tube is directed by the funnel guide 68 into striking engagement with the trigger 69, thus rocking the trigger to trip the latch 73 and release the lever 76. This frees the rockshaft 55 for rotation in a counterclockwise direction (as viewed in FIGURES 3 and 8). Such movement occurs under influence of the coil spring 81 anchored at one end to the laterally projected tail of a fixed frame bracket and intermediate rockshaft journal 82 and hooked at its other end to one arm of a bell crank 83 clamped to the shaft 55 at an intermediate point. Operation of rockshaft 55 permits the valve 44 to open the pressure source to the cylinder 28 for projection of the knife carriage with the traveling tube.

The other arm of the bell crank 83 is positioned in the path of a shoe 84 fastened on the knife carriage 22 whereby when the carriage has moved forward a predetermined amount, engagement of the shoe 84 with the bell crank 83 rocks the shaft 55 in a reverse or clockwise direction, whereby actuation of the valve control linkage at one end of the rockshaft vents the cylinder 28 and actuation of linkage at the opposite end of the rockshaft returns the lever 76 to its locked or latched position. In the return of the lever 76 the spring 74 yields to allow the latch 73 to be deflected until cleared by the lever and similarly the return of the trigger 69 under the influence of the spring 70 as the stock drops from the machine, is accommodated by depression of the dog 71 as it moves over and back of the latch 73.

At a predetermined intermediate point in the forward travel of the carriage the piston cylinder controlling the cutoff operation receives a shot of air under pressure through the valve body 85 constituting the head of the piston cylinder 17. This valve body, as seen in FIGURE 4, has in the chamber leading to the piston, a valve 86 which seats on one side over a port 87 communicating with air under pressure and seats on its opposite side over a port 88 leading to atmosphere. Its stem projects from the valve body and is connected to an operating lever 89 biased by a spring 90 to the vented position of the parts. A contact shoe 91 carried by the lever is arranged to engage at a predetermined point with an abutment roller 92 positioned in the path of the shoe whereby to rock the lever 89 and move the valve 86 to close off the atmosphere port 88 and enable air under pressure to raise the piston 16. The shoe 91 moves on past the abutment 92 during the continued further movement of the carriage thereby allowing the valve to be restored to cylinder venting position and the knife 7 to be retracted and the split clamps 6 to be separated.

Thereafter the return of the carriage is effected by the pull of the springs 31 upon engagement of the shoe 84 with the rock lever 83 controlling the valve 44 in the manner before described. As the carriage moves back the shoe 91 again contacts with the abutment 92 and in order to prevent operation of the knife on the return stroke of the carriage the abutment roller 92 is mounted on a swinging frame 94 having outwardly projecting pins which, as best seen in FIGURE 3, pivot the lever on a supporting bracket 95. A coil spring 96 normally holds the lever in upright position with its lower end in limiting engagement with the bracket 95 but yields to allow the lever to swing back for the return passage of the shoe 91. As seen in FIGURE 4 the bracket 95 is secured to a stationary part of the machine by the set screws 97 which pass through elongated openings in the bracket and thereby allow the bracket to be set in selected fore and aft positions in order properly to time knife operation.

The portion of the apparatus which has thus far been described is substantially the same as that of the aforesaid Shippy patent. Reference will now be had to the additional structure which characterizes the apparatus of the present invention and produces the new and very useful length control operation described in general terms in the preamble hereto.

As shown in FIGS. 2 and 4, a block 100 is attached to the closure plate 4 of cross bar 2 and includes an upstanding lug 101 whose right hand face, as viewed in FIGS. 1 and 2, is in the plane of cutting, so that a scale may be placed thereagainst in setting the machine for accurately cutting tubing to predetermined lengths. A bracket 102 which is generally U-shaped as viewed in plan has its left-hand leg, as viewed in FIGS. 1 and 6, fixed to the top of plate 65. The medial portion of U-shaped bracket 102 extends longitudinally of the machine rearwardly of the line of travel of the tubing.

The two legs of the bracket 102 are provided with anti-friction bearings 104 which receive a shaft 105 for axial sliding movement, the left-hand end of shaft 105 being fixed in block 100 whereby the shaft moves longitudinally with the knife carriage.

An abutment member designated generally by the reference numeral 106 is carried by shaft 105 between the legs of bracket 102 and is adapted to be clamped at any desired position along shaft 105. An abutment plate 108 is fixed to member 106 and normally lies across the path of tubing which issues from the funnel-shaped guide 68. The end of the tubing engages plate 108 immediately after such tubing end has passed the pad of bell crank 69 which actuates the trigger mechanism and before the carriage moves forwardly to any substantial degree.

When the incoming tubing strikes the pad of the bell crank 69 to actuate the trigger mechanism and ultimately apply operating pressure to cylinder 28, the responsive forward movement of the knife carriage is not instantaneous due to the time required for mechanical response of the trigger mechanism and for air to reach the cylinder 28 to a degree sufficient to initiate movement of the knife carriage. Accordingly, the tubing travels beyond the pad of bell crank 69 until it is arrested by engagement of the leading end thereof against abutment plate 108 which, being fixed for movement with the knife carriage, will not have moved appreciably at this instant.

Thus a fixed and predetermined length of tubing is established between plate 108 and the cutting plane of the knife mechanism as reflected in the aforesaid face of lug 101 of block 100. This arresting of or impedance to forward movement of the tubing is only momentary since the knife carriage begins its longitudinal movement almost simultaneously with the engagement of the end of the tubing against plate 108 and plate 108 moves longitudinally with the knife carriage.

This momentary arresting or partial impedance of the leading end of the tubing may result in a slight bowing of the tubing which is coming from the tube straightener or other apparatus which is in advance of the cutoff mechanism. Such bowing is permissible and is slight in degree since a fairly substantial length of free tubing may exist between the cutoff mechanism and the preceding straightener or other tube fabricating mechanism. However, since the length of tubing between the knife mechanism and the abutment plate 108 is relatively short and at least partly guided and supported, no apppreciable or noticeable bowing of this part of the tubing occurs.

It is desired that the endwise pressure of the abutment plate 108 against the tubing be removed before the cutting off is terminated so that the cut length of tubing may fall freely clear of the apparatus. To this end means are provided for swinging abutment plate 108 out of the way once the tubing has been securely engaged by the knife mechanism.

In addition to the plate 108 which normally projects horizontally from member 106 as shown in detail in FIG. 10, the latter has an upwardly extending portion 109 which carries a roller 110. A projection 111 which extends rearwardly from the portion 109 of member 106 is in longitudinal alignment with part 101 of block 100 of the knife carriage and the distance between these parts, which may be accurately measured, constitutes the length of the piece of tubing which is cut off.

A cam plate 112 is mounted upon bracket 102, being spaced thereabove by blocks 113, and has a cam slot 114 in which roller 110 travels upon forward movement of the knife carriage. Cam slot 114 is formed to deflect roller 110 and thus rotate abutment member 106 and shaft 105 to swing plate 108 upwardly out of the line of travel of the tubing, the cam track being so formed that the swinging movement occurs between the point where the tubing is securely engaged by the knife mechanism and the point where the severance of the tubing is complete. Cam plate 112 is adjustable longitudinally on blocks 113 by screw and slot connections 115.

As shown in FIG. 2, the right hand end of shaft 105 is slidable in a block 116 so that the reciprocating end of shaft 105 is enclosed and guarded. Block 116 may be mounted on bed plate 26 in any desired manner.

I claim:

1. In a machine for cutting off predetermined lengths of relatively rigid material from a moving strip, a knife carriage and fluid actuated means for moving the same in the direction of movement of said strip, means engageable by the leading end of the forwardly traveling strip to actuate said carriage moving means, an abutment fixed for longitudinal movement with said carriage and disposed beyond said engageable means whereby the leading end of said strip engages the abutment before the carriage reaches a speed approximating the speed of the moving strip, knife means reciprocably mounted in said carriage, fluid operated means to independently actuate said knife means during continued forward movement of the carriage selectively adjustable means to actuate said latter fluid operated means after predetermined forward movement of the carriage whereby a fixed length of stock is cut off as determined by the adjusted longitudinal distance between said abutment and the transverse plane of said cutting means, and means carried by said abutment coacting with deflecting means adjacent said engageable means for moving said abutment laterally from engagement with said strip after the latter has been engaged by said knife means.

2. In a machine for cutting off predetermined lengths of relatively rigid material from a moving strip, a carriage, cutting means reciprocably mounted in said carriage, means for moving said carriage in the direction of movement of said strip, an abutment fixed for longitudinal movement with said carriage and disposed forwardly of said cutting plane a predetermined adjustable distance equal to the length of the strip to be cut, means to actuate said cutting means during forward movement of the carriage after the leading end of said strip has engaged said abutment selectively adjustable means to actuate said actuating means after predetermined forward movement of the carriage whereby a fixed length of stock is cut off as determined by the adjusted longitudinal distance between said abutment and the transverse plane of said cutting means, and means carried by said abutment coacting with deflecting means adjacent said engagement for moving said abutment laterally from the path of said strip after the latter has been engaged by said cutting means.

3. In a machine for cutting off predetermined lengths of relatively rigid material from a moving strip, a knife carriage and fluid actuated means for moving the same in the direction of movement of said strip, means engageable by the leading end of the forwardly traveling strip to actuate said carriage moving means, an abutment fixed for longitudinal movement with said carriage and disposed beyond said engageable means whereby the leading end of said strip engages the abutment before the carriage reaches a speed approximating the speed of the moving strip, stock gripping means and knife means reciprocably mounted in said carriage, fluid operated means successively actuating said gripping means and said knife means during forward movement of the carriage selectively adjustable means to actuate said latter fluid operated means after predetermined forward movement of the carriage whereby a fixed length of stock is cut off as determined by the adjusted longitudinal distance between said abutment and the transverse plane of said cutting means, and means carried by said abutment coacting with deflecting means adjacent said engageable means for moving said abutment laterally from engagement with said strip after the latter has been engaged by said gripping means.

4. In a machine for cutting off predetermined lengths of relatively rigid material from a moving strip, a carriage, stock gripping means and reciprocable cutting means mounted in said carriage, and means for moving said carriage in the direction of movement of said strip, an abutment fixed for longitudinal movement with said carriage and disposed forwardly of said cutting plane a predetermined adjustable distance equal to the length of strip to be cut, means successively actuating said gripping means and said cutting means during forward movement of the carriage after the leading end of said strip has engaged said abutment selectively adjustable means to actuate said actuating means after predetermined forward movement of the carriage whereby a fixed length of stock is cut off as determined by the adjusted longitudinal distance between said abutment and the transverse plane of said cutting means, and means carried by said abutment coacting with deflecting means adjacent said engagement for moving said abutment laterally from the path of said strip after the latter has been engaged by said gripping means.

References Cited by the Examiner

UNITED STATES PATENTS

| | | | |
|---|---|---|---|
| 1,269,635 | 6/1918 | Neuman | 83—294 |
| 1,844,837 | 2/1932 | Braun | 83—294 X |
| 1,944,718 | 1/1934 | Rafter | 83—293 |
| 2,133,542 | 10/1938 | Jensen | 83—293 |
| 2,205,389 | 6/1940 | Borzym | 83—292 |
| 2,325,431 | 7/1943 | Shippy | 83—293 |
| 2,509,760 | 5/1950 | Crafton | 83—292 X |
| 2,540,166 | 2/1951 | Frank et al. | 83—292 |

WILLIAM W. DYER, Jr., *Primary Examiner.*

F. T. YOST, J. M. MEISTER, *Assistant Examiners.*